United States Patent
Bastide et al.

(10) Patent No.: US 9,582,564 B2
(45) Date of Patent: Feb. 28, 2017

(54) TAGGING OF ELECTRONIC CONTENT

(71) Applicant: INTERNATIONAL BUSINESS MACHINES CORPORATION, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 14/146,791

(22) Filed: Jan. 3, 2014

(65) Prior Publication Data
US 2015/0193518 A1 Jul. 9, 2015

(51) Int. Cl.
*G06F 17/30* (2006.01)
*H04L 29/08* (2006.01)

(52) U.S. Cl.
CPC .. *G06F 17/30595* (2013.01); *G06F 17/30616* (2013.01); *G06F 17/30722* (2013.01); *H04L 67/10* (2013.01); *H04L 67/306* (2013.01)

(58) Field of Classification Search
CPC ............................................... G06F 17/30595
See application file for complete search history.

(56) References Cited

U.S. PATENT DOCUMENTS

| | | | |
|---|---|---|---|
| 7,953,736 B2 | 5/2011 | Rinearson et al. | |
| 2008/0168055 A1* | 7/2008 | Rinearson | G06F 17/30997 |
| 2009/0192879 A1 | 7/2009 | Hood et al. | |
| 2009/0240692 A1* | 9/2009 | Barton | G06F 17/3082 |
| 2010/0082576 A1 | 4/2010 | Walker et al. | |
| 2011/0087674 A1 | 4/2011 | Schokking et al. | |
| 2011/0276430 A1* | 11/2011 | Vyas | G06Q 30/02 705/26.8 |
| 2014/0129570 A1* | 5/2014 | Johnson | H04N 21/4126 707/748 |
| 2015/0139610 A1* | 5/2015 | Syed | G11B 27/34 386/241 |
| 2015/0193518 A1 | 7/2015 | Bastide et al. | |

* cited by examiner

*Primary Examiner* — Apu Mofiz
*Assistant Examiner* — Dara J Glasser
(74) *Attorney, Agent, or Firm* — Law Office of Jim Boice

(57) ABSTRACT

A method, system, and/or computer program product manages content tags of electronic postings. A first weighted tag is received from a first reader of an electronic posting that supports tagging by non-authors. The first weighted tag, which includes a first weight, comprises metadata that describes the electronic posting. A second weighted tag, which includes a second weight, is received from a second reader of the electronic posting. The first and second weights are summed to generate a summed weight of the first and second weighted tags. In response to the summed weight of the first and second weighted tags being less than a predefined value, the metadata is automatically prohibited from being displayed with the electronic posting.

13 Claims, 3 Drawing Sheets

TAGGING OF ELECTRONIC CONTENT

BACKGROUND

The present disclosure relates to the field of computers, and specifically to the use of electronic content being displayed to computers via a network. Still more particularly, the present disclosure relates to tags that contain metadata about the electronic content being displayed on networked computers.

Electronic content includes web log (blog) entries, publication articles, etc. that are made available to readers by posting the electronic content to user computers via a network. Some electronic content postings are "tagged" with metadata, which describes the context and/or purpose and/or meaning of the information provided within the posted electronic content. The terms "electronic content" and "electronic posting" and "electronic content posting" are interchangeable, as all refer to content that is made available to viewers' computers via a network.

SUMMARY

A method, system, and/or computer program product manages content tags of electronic postings. A first weighted tag is received from a first reader of an electronic posting that supports tagging by non-authors. The first weighted tag, which includes a first weight, comprises metadata that describes the electronic posting. A second weighted tag, which includes a second weight, is received from a second reader of the electronic posting. The first and second weights are summed to generate a summed weight of the first and second weighted tags. In response to the summed weight of the first and second weighted tags being less than a predefined value, the metadata is automatically prohibited from being displayed with the electronic posting.

DETAILED DESCRIPTION

Figure 1:
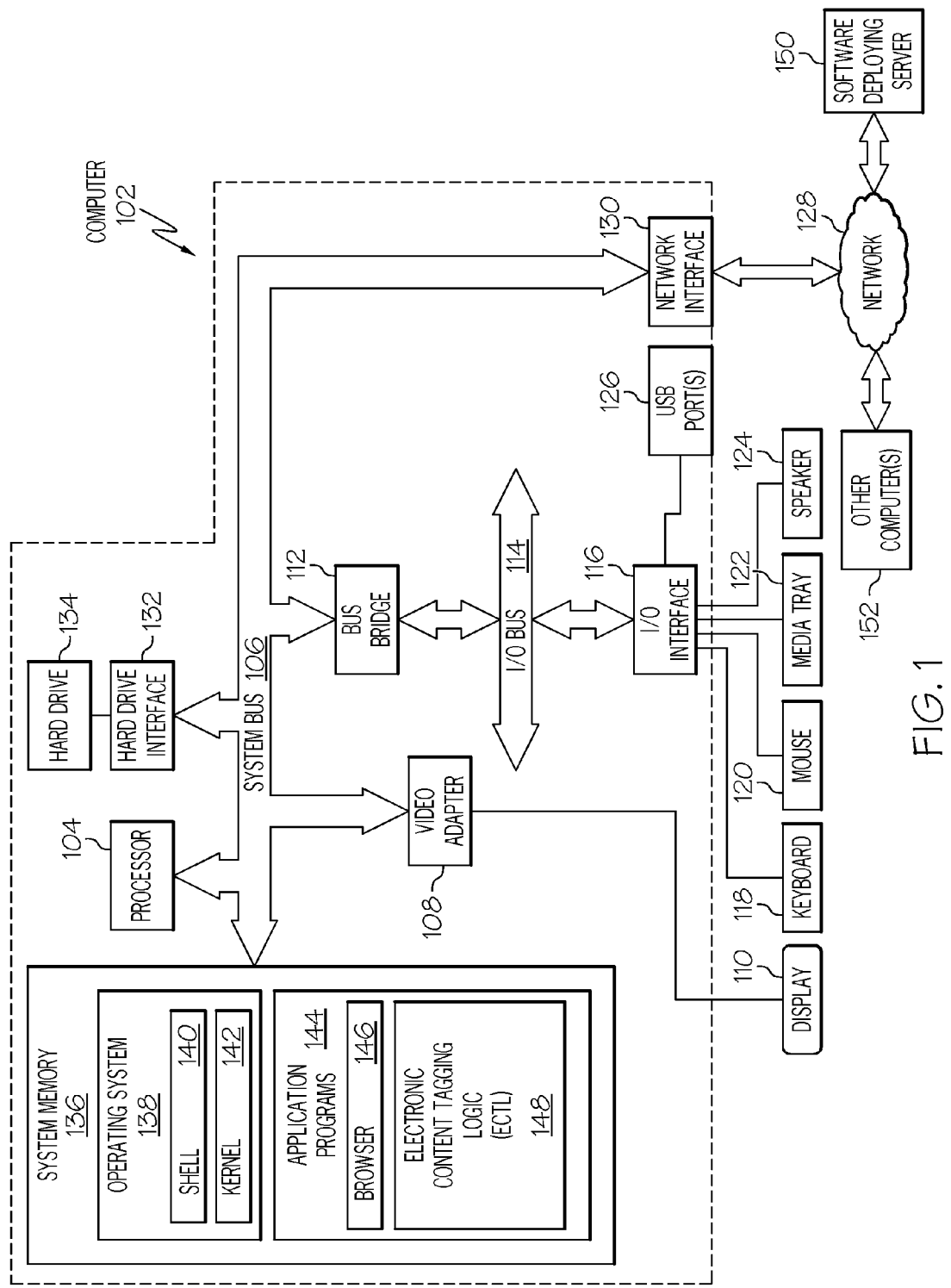
FIG. 1 depicts an exemplary system and network which may be used to implement the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or other computer(s) 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a speaker 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems such as other computer(s) 152.

Application programs 144 in computer 102's system memory (as well as software deploying server 150's system memory) also include an electronic content tagging logic (ECTL) 148. ECTL 148 includes code for implementing the processes described below, including those described in FIGS. 2-3. In one embodiment, computer 102 is able to download ECTL 148 from software deploying server 150, including in an on-demand basis, wherein the code in ECTL 148 is not downloaded until needed for execution. Note further that, in one embodiment of the present invention, software deploying server 150 performs all of the functions associated with the present invention (including execution of ECTL 148), thus freeing computer 102 from having to use its own internal computing resources to execute ECTL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
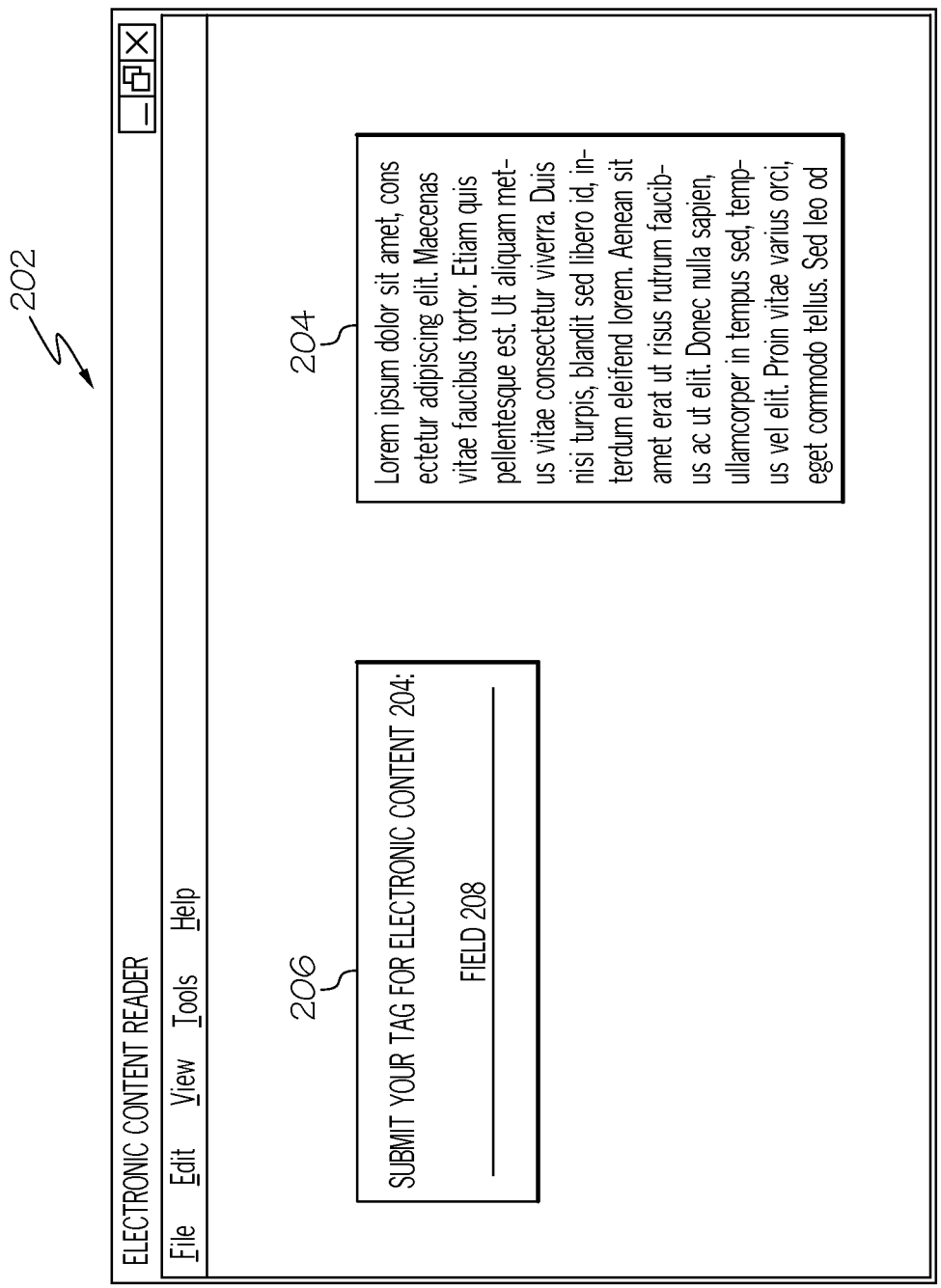
FIG. 2 illustrates an exemplary user interface that enables an electronic content reader to submit a content tag that describes the electronic content.

With reference now to FIG. 2, an exemplary user interface 202 (e.g., that is displayed on one or more of the other computers 152 depicted in FIG. 1) that enables an electronic content reader to submit a content tag that describes electronic content is presented. Presented within the user interface 202 is electronic content 204, which may be a web log (blog) posting, a publication article, an article on a webpage, a video imaging display (i.e., an active window that displays a video upon activation, either automatically or by a user's click, etc.), a photograph, etc. that is posted by a computer (e.g., computer 102 shown in FIG. 2). Electronic content 204 supports reader tagging via an active window 206. That is, a viewer/reader of the electronic content 204 is invited to enter a content tag into active field 208.

For example, assume that user interface 202 is being displayed on one or more of the other computers 152 depicted in FIG. 1. A user of one of the other computers 152 enters a descriptive tag into field 208. In one embodiment, this descriptive tag is created by the reader/viewer by manually typing the descriptive tag (without any cues) into field 208. Note that the user's input/selected tag is not made visible to other readers/viewers until combined weights of submitted tags reach a predefined value (see below).

Figure 3:
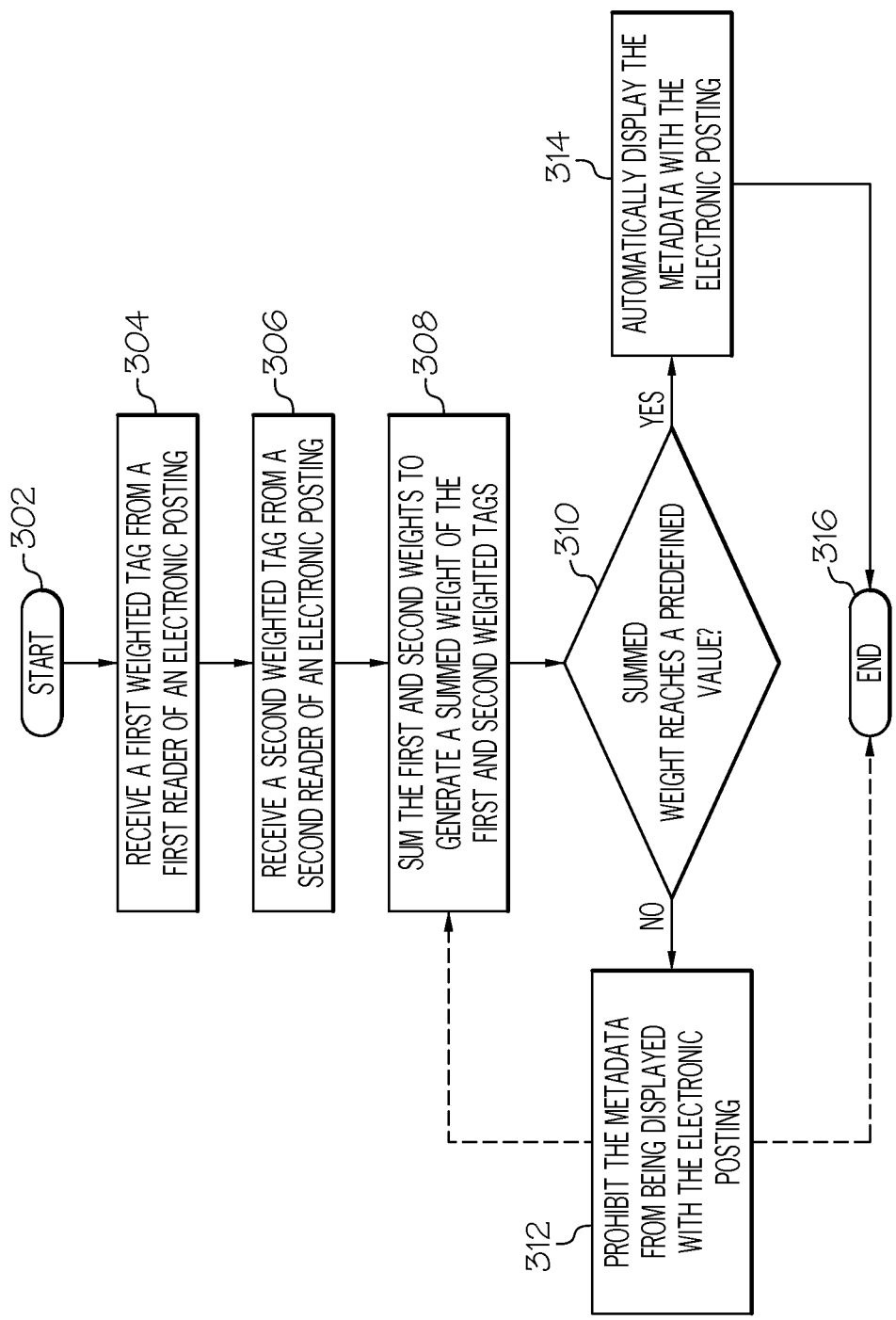
FIG. 3 is a high level flow chart of one or more exemplary steps taken by one or more processors to manage content tags of electronic content.

With reference now to FIG. 3, a high level flow chart of one or more exemplary steps taken by one or more processors to manage content tags of electronic postings is presented. After initiator block 302, which may be prompted by posting an electronic content on-line via a webpage, blog, etc., a first weighted tag is received from a first reader of an electronic posting. This weighted tag is 1) a content tag (e.g., a tag that has been entered by a reader/viewer into field 208 depicted in FIG. 2) that the reader/viewer has deemed to be descriptive of the electronic content, and 2) which has been weighed by a weight (described below). Thus, the electronic posting supports tagging by non-authors of the electronic posting, such as readers/viewers of the electronic posting. That is, in one embodiment it is not the author who assigned tags/metadata to the electronic posting, but rather non-authors who only read/view the electronic posting.

The first weighted tag comprises metadata that describes the electronic posting. For example, assume that the electronic posting is an article about restaurants in New York. Metadata that describes the article may be "restaurants", "culinary arts", "entertainment", "New York", etc. As indicated by the term "weighted tag", the tag (i.e., metadata) is given a weight. This weighting is based on the particular reader/viewer of that electronic posting, either manually or automatically.

For example, assume (in the example above regarding the article about New York restaurants) that the reader of the article is a chef. Logic such as ECTL 148 in FIG. 1 will obtain this information from a questionnaire that accompanies the reader's submitted tag, a stored reader profile, etc. ECTL 148 then determines, based on author-provided metatags and/or context data mining of the article, that the article is directed to the field of culinary arts, in which a chef is an expert. Thus, the submitted tag of a chef is weighted more heavily (e.g., is assigned a weight of "10") than a reader who is not a chef.

Alternatively, the weight of the first weighted tag is directly defined by the reader. That is, the reader himself is allowed to determine, based on a presented scale from ECTL 148, the weight of his own tag. For example, the reader may assign a tag of "entertainment" and "nutrition". That same reader, however, may consider "entertainment" to be more accurate in describing the article than "nutrition". As such, that reader may assign the tag "entertainment" a weight of "10", and the tag of "nutrition" a weight of only "3".

In either embodiment (automatic weighting or manual weighting), the derived weight for the tag/metadata is associated with a particular reader/viewer of the electronic posting.

With reference now to block 306 in FIG. 3, a second weighted tag is then received from a second reader of the electronic posting. This second weighted tag comprises the same metadata found in the first weighted tag that was submitted by the first reader. As with the first weight, a second weight of the second weighted tag is defined by the second reader in order to weight a second relevance level, as defined by the second reader, of the metadata to the electronic posting. For example, if the second reader is not a chef, then the weight of his tag may be only "5", as opposed to the "10" that is automatically assigned to the chef discussed above. Similarly, in another embodiment the second reader assigns his own weights manually. For example, assume that the second reader also assigned the tags "entertainment" and "nutrition" to the same article that was read/tagged by the chef. This second may consider "entertainment" to be less accurate in describing the article than "nutrition", and may assign the tag "entertainment" a weight of only "2", and the tag of "nutrition" a weight of "8".

Note that in one embodiment, the weights are produced using any combination of the manual/automatic assignments discussed above. For example, the weights of tags presented by a first reader may be automatic (based on his/her occupation, education level, publication history, etc.), while the weights of tags presented by a second reader may be manually provided by the second reader, while the weights of tags presented by a third reader may be a combination of automatic and manual weight assignments to various tags provided by the third reader, etc.

As described in block 308 in FIG. 3, one or more processors then sums all of the weights for the summed tags to generate a summed weight of all of the tags. As described in query block 310, a query is made to determine if this summed weight exceeds a predefined value. If the summed weight does not reach this predefined value (query block 310), then the tags/metadata are automatically blocked from being displayed with the electronic posting (block 312). That is, once the reader enters the content tag that he created, it is sent to the source of the electronic posting and is no longer visible on the user interface 202 shown in FIG. 2. Furthermore, that content tag will not be visible to any other user interface that is displaying that electronic posting (either on a same page/display or on another page/display) unless a weight summation reaches the predefined value. In one embodiment, the process ends at terminator block 316 (e.g., if a certain amount of time has passed since the electronic posting was put on the network without the predefined summed weight value being reached). In another embodiment, however, the process continues to monitor additional tags and their weights (block 308) in order to determine if the summed weight eventually reaches the predefined value (query block 310).

Returning to query block 310, assume that the summed weight reaches or exceeds the predefined value. For example, assume that the predefined value is 100. If 100 readers submit the same tag "restaurant", and the average weight (assigned automatically or manually by the reader) for each of the tags is 1, then the predefined value of 100 is reached, and the content tag "restaurant" is displayed with the electronic posting to other viewers/computers. Similarly, if 10 readers submit the same tag "restaurant", and the average weight (assigned automatically or manually by the reader) for each of the tags is 10, then the predefined value of 100 is similarly reached, and the content tag (i.e., metadata) "restaurant" is automatically displayed with the electronic posting to other viewers/computers (block 314). Again, the process ends at terminator block 316.

In one embodiment of the present invention, a same reader submits two tags for a same electronic posting. For example assume that a first reader first submitted the tag "restaurant" in the field 208 in FIG. 2, and then later (i.e., at a later date or simply by typing below or after "restaurant" in field 208), submits the tag "entertainment". Due to the fact that this reader entered "restaurant" first and "entertainment" second, logic such as ECTL 148 in FIG. 1 automatically assigns a primary weight to the first tag to generate a primary weighted tag and a secondary weight to the second tag to generate a secondary weighted tag, wherein the primary weight is greater than the secondary weight based on the first reader having submitted the first tag before submitting the second tag. For example, ECTL 148 may automatically assign a weight of 10 to the tag "restaurant" and a weight of 5 of the tag "entertainment", based solely on the fact that the tag "restaurant" was submitted before the tag "entertainment" by the same reader of the article about New York restaurants.

In one embodiment of the present invention, a particular weight is assigned to a particular reader as a default weight for tags submitted by that reader. For example, in one embodiment the default weight is based on a relationship between a subject matter of the electronic posting and an occupation of the first reader. In the example described above, a chef is automatically given a default weighting for her tags that is different (e.g., higher) than a default weighting for a non-chef.

In another example/embodiment, the default weight is based on a relationship between a subject matter of the electronic posting and a publication history of the first reader. For example, if the reader of the article about New York restaurants has a history of blog postings, magazine articles, etc. about New York restaurants (e.g., as determined by ECTL 148 through data mining of on-line content), then the tags from that reader will be weighted higher than tags from persons who have never written on the subject of New York restaurants.

In one embodiment of the present invention, a reader submits a negative weight to a particular tag. For example, assume that a reader expects that other readers will consider "roaches" to be a valid tag for an article about New York restaurants. However, the current reader does not feel that "roaches" is a valid tag for the article, which never mentioned any health or vermin issues in the article. Therefore, the reader can submit the tag "roaches" with a user-generated (manual) weight of −10 (assuming that the entity posting the article permits negative weightings from the readers who are submitting tags).

Note that in one embodiment, all of the submitted weights for the tags entered by the readers/viewers are within a range that has been set by the publisher of the electronic content. For example, logic such as ECTL 148 in FIG. 1 may define the range of weights to be within −10 and +10. In one embodiment, these ranges are presented to the reader/viewer (e.g., on the user interface 202 shown in FIG. 2).

In one embodiment of the present invention, different summed weights determine who is able to access/see the tags. For example, assume that the electronic content is content that has been generated by an enterprise, and is presented on a network (e.g., the Internet). Assume further that this network is accessible to Group A (e.g., the enterprise's personnel), Group B (e.g., the general public), and Group C (e.g., the enterprise's customers). In order for Group A to view a particular tag, that tag need only have a combined weight (from the multiple submissions of that tag) of 25 in order to be displayed with the electronic content to Group A. Similarly, in order for Group B to view that tag, it needs to have a combined weight (from the multiple submissions of that tag) of 50 in order to be displayed with the electronic content to Group B, since there is an assumption that the general public is entitled to see tags that are more universally accepted/used. Similarly, in order for Group C to view that tag, it needs to have a combined weight (from the multiple submissions of that tag) of 100 in order to be displayed with the electronic content to Group C, since there is a further assumption that the enterprise's customers deserve to see tags that have been even greater usage/acceptance by multiple readers of the electronic content.

In one embodiment of the present invention, tags that are displayed with the electronic content are visually coded to indicate how accepted they are. For example, assume that a tag for a particular posted article about New York restaurants is "restaurant". If the summed weights of reader-entered tags of "restaurant" reaches 100, then the tag "restaurant" is presented with the electronic content, as described above. However, if the summed weights of reader-entered tags of "restaurant" has only reached 50, then the tag "restaur" (i.e., a truncated version of "restaurant") is presented with the electronic content.

In another embodiment, if the summed weights of reader-entered tags of "restaurant" has reached 100, then the tag "restaurant" is visually coded (e.g., colored green) when presented with the electronic content. However, if the summed weights of reader-entered tags of "restaurant" has only reached 50, then the tag "restaurant" is visually coded differently (e.g., colored yellow or red) when presented with the electronic content.

As described herein, in one embodiment of the present invention a second reader of the electronic content/posting is prevented from viewing the first weighted tag and the metadata that was entered by the first reader. That is, the tag submitted by another reader is not made visible to any other readers until/unless enough readers submit that same tag (with the requisite summed weights). Thus, in this embodiment the present invention does not allow a first reader to present a tag, which is visible to other readers, who can then simply agree with that tag by clicking on it. Rather, the present invention requires different readers to independently create the same tag. The weights of these independently derived copies of the same tag (by different readers/viewers) are then summed in the manner described herein, in order to permit that tag to be displayed alongside the electronic content/posting.

Note that while the terms "first reader" and "second reader" may be used in the claims appended hereto, such use of the terms "first" and "second" should not be construed as limiting such readers in a temporal construction. That is, the claims should not be interpreted as defining the "first reader" as a person/entity who reads the electronic content/posting before a "second reader". Rather, the terms "first" and "second" are used only to identify the two readers as being different persons (or alternatively, as different hardware entities such as processing devices that intelligently examine the electronic content/posting). However, in one embodiment the "first reader" is a user who has read the electronic content/posting before the "second reader", while in another embodiment the "first reader" is a user who has read the electronic content/posting after the "second reader".

Note that the flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Having thus described embodiments of the invention of the present application in detail and by reference to illustrative embodiments thereof, it will be apparent that modifications and variations are possible without departing from the scope of the invention defined in the appended claims.

What is claimed is:

1. A computer program product for managing content tags of electronic postings, the computer program product comprising a non-transitory computer readable storage medium having program code embodied therewith, the program code readable and executable by a processor to perform a method comprising:

receiving a first weighted tag from a first reader of an electronic posting, wherein the electronic posting supports tagging by non-authors of the electronic posting, wherein the first weighted tag comprises metadata that describes the electronic posting, and wherein a first weight of the first weighted tag is defined by the first reader to weight a first relevance level, as defined by the first reader, of the metadata to the electronic posting;

receiving a second weighted tag from a second reader of the electronic posting, wherein the second weighted tag comprises the metadata from the first weighted tag, and wherein a second weight of the second weighted tag is defined by the second reader to weight a second relevance level, as defined by the second reader, of the metadata to the electronic posting;

summing the first and second weights to generate a summed weight of the first and second weighted tags;

in response to the summed weight of the first and second weighted tags being less than a predefined value, automatically prohibiting the metadata from being displayed with the electronic posting;

assigning a first summed weight threshold to a first group of viewers;

comparing the first summed weight threshold to the summed weight of the first and second weighted tags;

determining that the first summed weight threshold is less than the summed weight of the first and second weighted tags;

assigning a second summed weight threshold to a second group of viewers;

comparing the second summed weight threshold to the summed weight of the first and second weighted tags;

determining that the second summed weight threshold is greater than the summed weight of the first and second weighted tags;

in response to determining that the first summed weight threshold is less than the summed weight of the first and second weighted tags, displaying the metadata to the first group of viewers; and in response to determining that the second summed weight threshold is greater than the summed weight of the first and second weighted tags, preventing a display of the metadata to the second group of viewers.

2. The computer program product of claim 1, wherein the method performed by the processor executing the program code further comprises:

in response to the summed weight of the first and second weighted tags exceeding the predefined value, automatically displaying the metadata with the electronic posting.

3. The computer program product of claim 1, wherein the method performed by the processor executing the program code further comprises:

receiving a first tag and a second tag from the first reader, wherein the first and second tags describe the electronic posting, and wherein the first reader submitted the first tag before submitting the second tag; and automatically assigning a primary weight to the first tag to generate a primary weighted tag and a secondary weight to the second tag to generate a secondary weighted tag, wherein the primary weight is greater than the secondary weight based on the first reader having submitted the first tag before submitting the second tag.

4. The computer program product of claim 1, wherein a third weight is automatically assigned to the first reader as a default weight.

5. The computer program product of claim 4, wherein the default weight is based on a relationship between a subject matter of the electronic posting and an occupation of the first reader.

6. The computer program product of claim 4, wherein the default weight is based on a relationship between a subject matter of the electronic posting and a publication history of the first reader.

7. The computer program product of claim 1, wherein the method performed by the processor executing the program code further comprises:
   preventing the second reader from viewing the metadata from the first weighted tag that was entered by the first reader.

8. A computer system comprising:
   a processor, a computer readable memory, and a non-transitory computer readable storage medium;
   first program instructions to receive a first weighted tag from a first reader of an electronic posting, wherein the electronic posting supports tagging by non-authors of the electronic posting, wherein the first weighted tag comprises metadata that describes the electronic posting, and wherein a first weight of the first weighted tag is defined by the first reader to weight a first relevance level, as defined by the first reader, of the metadata to the electronic posting;
   second program instructions to receive a second weighted tag from a second reader of the electronic posting, wherein the second weighted tag comprises the metadata from the first weighted tag, and wherein a second weight of the second weighted tag is defined by the second reader to weight a second relevance level, as defined by the second reader, of the metadata to the electronic posting;
   third program instructions to sum the first and second weights to generate a summed weight of the first and second weighted tags;
   fourth program instructions to, in response to the summed weight of the first and second weighted tags being less than a predefined value, automatically prohibit the metadata from being displayed with the electronic posting;
   fifth program instructions to assign a first summed weight threshold to a first group of viewers;
   sixth program instructions to compare the first summed weight threshold to the summed weight of the first and second weighted tags;
   seventh program instructions to determine that the first summed weight threshold is less than the summed weight of the first and second weighted tags;
   eighth program instructions to assign a second summed weight threshold to a second group of viewers;
   ninth program instructions to compare the second summed weight threshold to the summed weight of the first and second weighted tags;
   tenth program instructions to determine that the second summed weight threshold is greater than the summed weight of the first and second weighted tags;
   eleventh program instructions to, in response to determining that the first summed weight threshold is less than the summed weight of the first and second weighted tags, display the metadata to the first group of viewers; and
   twelfth program instructions to, in response to determining that the second summed weight threshold is greater than the summed weight of the first and second weighted tags, prevent a display of the metadata to the second group of viewers; and wherein
   the first, second, third, fourth, fifth, sixth, seventh, eighth, ninth, tenth, eleventh, and twelfth program instructions are stored on the non-transitory computer readable storage medium for execution by the processor via the computer readable memory.

9. The computer system of claim 8, further comprising:
   thirteenth program instructions to, in response to the summed weight of the first and second weighted tags exceeding the predefined value, automatically display the metadata with the electronic posting; and wherein
   the thirteenth program instructions are stored on the non-transitory computer readable storage medium for execution by the processor via the computer readable memory.

10. The computer system of claim 8, further comprising:
    thirteenth program instructions to receive a first tag and a second tag from the first reader, wherein the first and second tags describe the electronic posting, and wherein the first reader submitted the first tag before submitting the second tag; and
    fourteenth program instructions to automatically assign a primary weight to the first tag to generate a primary weighted tag and a secondary weight to the second tag to generate a secondary weighted tag, wherein the primary weight is greater than the secondary weight based on the first reader having submitted the first tag before submitting the second tag; and wherein
    the thirteenth and fourteenth program instructions are stored on the non-transitory computer readable storage medium for execution by the processor via the computer readable memory.

11. The computer system of claim 8, wherein a third weight is automatically assigned to the first reader as a default weight.

12. The computer system of claim 11, wherein the default weight is based on a relationship between a subject matter of the electronic posting and a publication history of the first reader.

13. The computer system of claim 8, further comprising:
    thirteenth program instructions to prevent the second reader from viewing the metadata from the first weighted tag that was entered by the first reader; and wherein
    the thirteenth program instructions are stored on the non-transitory computer readable storage medium for execution by the processor via the computer readable memory.

* * * * *